United States Patent
Chakraborty

(10) Patent No.: US 6,516,870 B1
(45) Date of Patent: Feb. 11, 2003

(54) TUNDISH FLUXING PROCESS

(75) Inventor: Sanjib Chakraborty, Southgate, MI (US)

(73) Assignee: National Steel Corporation, Mishawaka, IN (US)

( * ) Notice: Subject to any disclaimer, the term of this patent is extended or adjusted under 35 U.S.C. 154(b) by 0 days.

(21) Appl. No.: 09/571,318

(22) Filed: May 15, 2000

(51) Int. Cl.[7] .................. B22D 11/10; B22D 41/00; C22B 9/10

(52) U.S. Cl. ................. 164/473; 164/488; 75/305

(58) Field of Search ................ 164/473, 55.1, 164/57.1, 488, 437, 472; 75/303, 305; 266/227, 229; 222/591, 592, 593

(56) References Cited

U.S. PATENT DOCUMENTS

| | | | | |
|---|---|---|---|---|
| 3,698,466 A | * | 10/1972 | Vogt et al. ................ | 164/465 |
| 4,190,444 A | * | 2/1980 | Carini ...................... | 164/451 |
| 4,202,692 A | * | 5/1980 | Carini ...................... | 164/473 |
| 4,715,586 A | * | 12/1987 | Schmidt et al. ........... | 266/275 |
| 4,738,719 A | * | 4/1988 | McLean et al. ............ | 75/257 |
| 4,770,395 A | * | 9/1988 | Vo Thanh et al. ........ | 266/275 |
| 4,852,632 A | * | 8/1989 | Jackson et al. ............ | 164/437 |
| 5,028,257 A | * | 7/1991 | Tomkins et al. ........... | 75/305 |
| 5,169,591 A | * | 12/1992 | Schmidt et al. ............ | 266/275 |
| 5,179,997 A | * | 1/1993 | Koul et al. ................. | 164/473 |
| 5,332,418 A | * | 7/1994 | Daussan et al. ............ | 75/303 |
| 5,356,454 A | * | 10/1994 | Itoyama et al. ............ | 75/305 |
| 5,366,535 A | * | 11/1994 | Heaslip et al. ............. | 75/305 |
| 5,397,379 A | * | 3/1995 | Barker et al. .............. | 75/319 |
| 5,551,672 A | * | 9/1996 | Schmidt .................... | 266/229 |
| 5,782,956 A | * | 7/1998 | Janke et al. ................ | 75/305 |
| 5,887,647 A | * | 3/1999 | Melville et al. ............ | 164/472 |
| 6,174,347 B1 | * | 1/2001 | Barker ....................... | 75/560 |
| 6,179,895 B1 | * | 1/2001 | Barker ....................... | 75/323 |

* cited by examiner

Primary Examiner—M. Alexandra Elve
Assistant Examiner—Kevin P. Kerns
(74) Attorney, Agent, or Firm—James L. Bean

(57) ABSTRACT

A process for continuously casting steel wherein liquid steel is teemed from a ladle through a shroud into the pour box section of a tundish and poured from the tundish through one or more outlets remote from the pour box, and wherein the surface of the steel in the tundish is covered with a first flux in the area of the pour box and with a second flux in the remaining areas of the tundish. The flux used in the pour box area has a higher melting temperature than the flux used in the remaining areas. Preferably all fluxes used are basic fluxes containing CaO and $Al_2O_3$.

10 Claims, 1 Drawing Sheet

TUNDISH FLUXING PROCESS

BACKGROUND OF THE INVENTION

1. Field of the Invention

This invention relates to the application of flux to the surface of molten steel in a container and more particularly to an improved process for the application of flux in a continuous casting tundish.

2. Description of the Prior Art

In a continuous steel casting operation, liquid steel is teemed from a ladle into a tundish where a reservoir of metal is maintained and from which the metal flows at a controlled rate into one or more casting molds. In such an operation, it is the standard practice to provide a flux or slag cover on the molten steel in the tundish, and molten steel flows from the ladle into the tundish through a ladle shroud tube which penetrates below the flux layer.

The tundish flux layer performs three primary functions as explained, for example, in U.S. Pat. Nos. 4,738,719 and 5,366,535. These function are providing a thermal insulating blanket covering the top surface of the molten steel, protecting the steel from exposure to the atmosphere to prevent atmospheric oxidation, and the absorption from the molten steel mass of inclusions which come into contact with the molten flux surface.

Numerous flux compositions are known and used to produce a tundish slag to achieve desired results depending on the composition of the molten steel and, to some extent, the effect of the flux on the refractory of the tundish and/or the ladle shroud. Also, flux composition may be varied to affect the physical characteristics of the slag, including its fluidity, the slag build-up on the tundish wall, and the ease with which the ladle shroud may penetrate the slag layer. Inclusions such as alumina particles are absorbed or scavenged from the liquid steel only into the liquid phase or layer of flux so that relatively rapid fusion and distribution of the flux over the steel surface is important at the beginning of a casting campaign or where a new tundish is put into use. At the same time, if the melting temperature of the flux is too low, the flux will become excessively fluid with extended use of the tundish, resulting in adverse effects on other features such as the thermal insulating quality of the slag layer.

As is known, the steel temperature is not uniform throughout the tundish in a continuous casting operation. For example, the temperature in the vicinity of the ladle shroud, sometimes referred to as the pour box, is higher than in the area near the tundish outlet, or outlets. As a result of this temperature differential, a liquid flux layer is generated relatively quickly in the area of the pour box, even when using a flux with a relatively high melting temperature, whereas as many as four or more heats may be cast before an adequate liquid flux layer is produced in areas remote from the ladle shroud. Also, ladle slag carried over into the tundish is very fluid and contributes to the formation of a liquid slag layer in the pour box area. Reducing the flux melting temperatures to quickly obtain a liquid cover in the area of the tundish outlet can result in the slag in the area of the pour box becoming excessively fluid, thereby reducing its insulating capability. Also, during ladle change-over, the liquid slag can solidify into a glassy matrix, making it difficult to submerge the ladle shroud on the next heat.

It is known to employ a double-layer slag covering consisting of a first basic flux layer in contact with the steel and an insulating layer of powdery material floating on the top of the first layer. This insulting layer generally consists of or includes a highly siliceous (90–95% by weight) rice hull ash, risking contamination and reducing the effectiveness of the first basic flux layer, although the procedure does substantially reduce the problem of the frozen surface of the slag resisting penetration of the ladle shroud.

To accelerate the generation of a liquid flux layer, it has generally been recommended that the flux chemistry be modified by increasing the silica content and/or by adding fluorspar or calcium fluoride to the parent flux. Increasing the silica or acidic oxide content of the tundish flux is a departure from a basic flux practice, however, and increasing the silica tends to simultaneously increase the FeO and MnO content of the slag. Silica, FeO and MnO can reoxidize steel and create alumina inclusions instead of helping to remove existing inclusions. Further, the addition of fluorspar can increase the alumina absorption capacity so as to quickly erode the alumina graphite ladle shroud and tundish refractories. This drawback of fluorspar is evidenced even in the carryover of ladle slag containing fluorspar into the tundish.

Various means are known and used to control or influence the flow of liquid metal through the tundish from the vicinity of the pour box to the outlets. These may include impact pads designed to produce desired currents in the liquid steel, as well as weirs and/or baffle walls projecting upwardly from the tundish floor. Baffle walls extending the full height and width of the tundish are frequently used, and these walls are provided with a pattern of opening or channels extending therethrough in a direction to produce the desired flow pattern to minimize channeling and to enhance contact of the liquid steel with the molten flux layer to promote the pick-up of inclusions from the steel. Examples of such devices may be found, for example, in U.S. Pat. Nos. 5,551,672, 5,169,591 and 4,852,632.

Despite the improvements made in recent years both in fluxing materials and practice and in tundish design, the increasing demand for higher quality steel continues to pressure the industry for further improvements. Accordingly, it is a primary object of the present invention to provide an improved tundish fluxing process in a continuous casting operation to optimize the heat insulation and inclusion absorption function of the flux.

Another object is to provide such a tundish fluxing process which enables a more uniform liquid flux layer to be maintained over the surface of the liquid steel in a continuous casting operation.

Another object is to provide such an improved fluxing process which does not require expensive changes in the tundish design or casting operation.

Another object is to provide such an improved process which utilizes known flux compositions in a manner to more efficiently achieve the fluxing functions described above.

SUMMARY OF THE INVENTION

The foregoing and other objects and advantages are achieved in accordance with the present invention in which different flux compositions are employed to provide the slag cover in different areas of the tundish in a continuous casting operation. Specifically, a flux having a higher melting temperature such as a high lime (CaO) low alumina ($Al_2O_3$) flux is employed in the pour box area of the tundish, while a flux with a lower melting temperature such as a high lime, high alumina flux is employed in areas of the tundish remote from the pour box. Due to the higher steel temperature in the pour box area and to mixing with any ladle slag carried over into the tundish, a liquid flux cover is normally quickly produced in this area, even when using a relatively low alumina flux having a higher melting temperature. Since a higher alumina flux has a lower melting temperature, it is employed in areas where the steel temperature is slightly lower, thereby also quickly producing a liquid flux cover for the entire tundish. Flow divider means, preferably the tundish baffle(s), separates the two areas and effectively prevents intermixing of the fluxes in the different areas. By maintaining a desired liquid flux layer thickness over the entire tundish area, the efficiency of the flux as a heat insulation cover and as an inclusion absorption medium is optimized.

The use of a relatively low melting flux in the tundish outlet area results in quickly producing an effective slag for absorbing inclusions from the initial heats in a tundish. Since the liquid cover produced by a fast melting flux has reduced heat insulation capabilities, after the initial heats are cast from a tundish, a compatible higher melting temperature flux can be added to form a powder layer on top of the liquid layer in the outlet area of the tundish. By employing a fast melting flux with a higher alumina content in contact with the liquid steel and a lower alumina flux layer on top, an optimum lime-to-alumina ratio for inclusion absorption may be maintained throughout the casting sequence by the continuous interaction of the alumina enriched liquid slag layer and the covering low alumina flux layer which simultaneously enhancing the thermal insulation efficiency of the slag.

BRIEF DESCRIPTION OF THE DRAWINGS

The foregoing and other objects and advantages of the invention will be apparent from the detailed description contained hereinbelow, taken in connection with the drawing, in which.

DETAILED DESCRIPTION OF THE INVENTION

A wide variety of flux compositions useful in the production of steel are commercially available, and variations in flux compositions are used depending on the composition and grade of steel being produced. The present invention utilizes a basic flux of the general type commonly employed as a tundish flux, with the ratio of certain components of the flux mixture differing depending upon where the flux is added to the tundish.

It is known from published lime-alumina binary phase diagrams that the melting point of a lime-alumina flux is decreased with an increase in the alumina content up to about 50% alumina, beyond which point the melting temperature starts to increase with increased percentage of alumina. Thus, in a basic lime-alumina flux, the melting temperature can be adjusted by increasing or decreasing the alumina content below about 50%.

According to the present invention, a first flux having a relatively low alumina content is utilized in the area of the pour box. The higher temperature of the steel in this section quickly melts a portion of this low alumina flux, providing a liquid layer for absorbing inclusions from the surface of the relatively turbulent liquid steel in this section. Sufficient flux is used to provide a powdery layer on top of the liquid layer to act as a thermal insulation and to reduce the tendency of the surface to freeze during ladle changeover.

A second flux having a higher alumina content, and consequently a lower melting temperature, is used downstream of the pour box. The lower melting temperature is such as to again quickly produce a layer of liquid covering the surface of the liquid steel so that the flux is effective in removing inclusions even on the initial heats cast from a tundish. The slag produced from the high and low melting temperature fluxes are separated by a wall in the tundish, preferably the upper portion of the tundish baffle wall.

As stated above, a liquid flux is not an efficient heat insulator, and this invention contemplates the use of a third low alumina, higher melting temperature flux on top of the layer of a second flux. While this concept may be unitized on either section of the tundish, it may be particularly advantageous in the area where a relative high alumina flux is initially used since extended use and the continued absorption of alumina from the steel may result in a more complete liquidization of the initial flux layer and a consequent lowering of the heat insulating and inclusion absorption capability.

Figure 1:
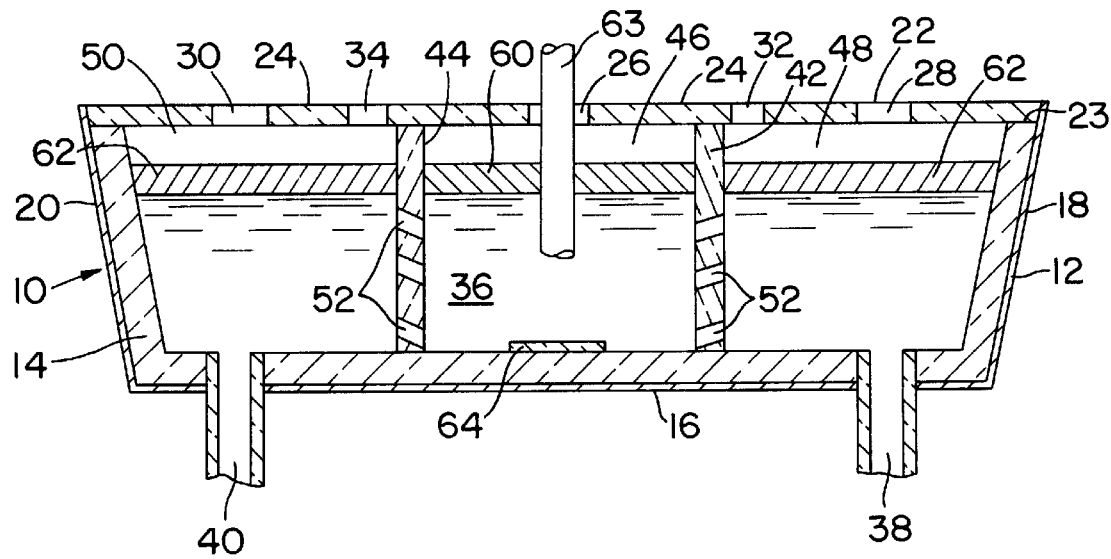
FIG. 1 is a schematic elevation view, in section, of a continuous caster tundish showing flux layers formed from different fluxes employed on opposite sides of the tundish baffles.
Figure 2:
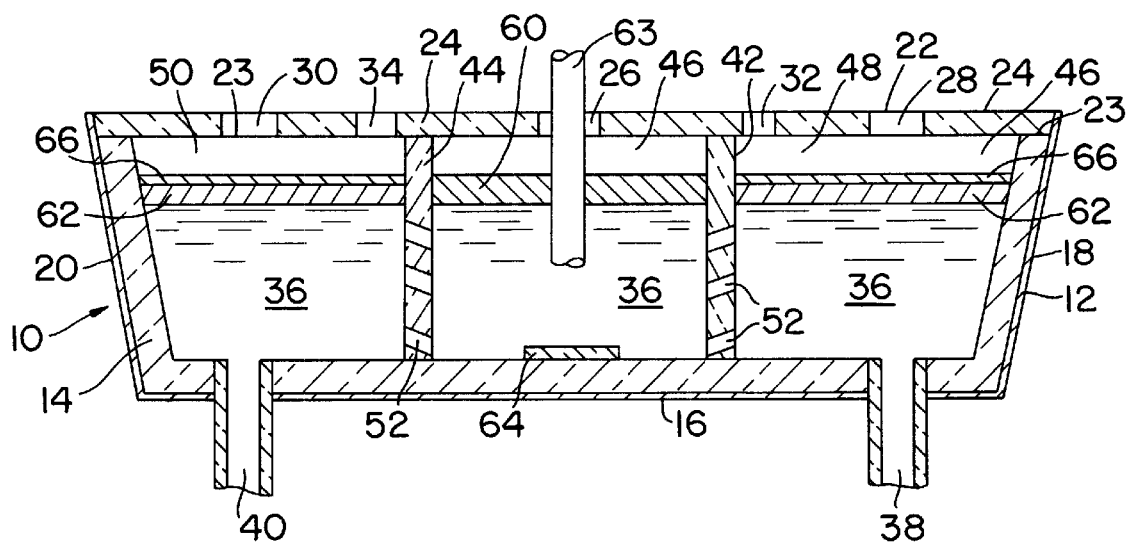
FIG. 2 is a view similar to FIG. 1 showing a two layer slag employed on one side of the baffles.

Referring now to the drawings, a tundish of the type commonly employed in a two strand caster is designated generally by the reference numeral 10 in FIG. 1 and includes on external steel shell 12 housing a cast refractory lining 14 covering the inner surface of its bottom wall 16, opposed end walls 18, 20 and sidewalls 22, only one of which is shown. Shell 12 may project upwardly slightly from the refractory lining 14 to provide a ledge 23 for supporting and retaining a removable slab-like refractory cover 24. A plurality of access openings are formed in the cover 24, including a central shroud tube opening 26, a first pair of openings 28, 30 located one near end walls 18, 20 respectively, and a second pair of openings 32, 34 located one between shroud tube opening 26 and each opening 28, 30. The access openings provide access to the interior of the tundish for monitoring the temperature of the steel and other purposes including deposition flux onto the surface of the molten steel supply 36. A pair of shrouds or pouring tubes 38, 40 are supported in bottom wall 16 beneath nozzle holes 28, 30 respectively, for delivering molten steel from the supply 36 to caster molds, not shown, in the conventional manner.

A pair of baffle walls 42, 44 are positioned in the tundish one between the shroud tube hole 26 and each access opening 32, 34 with the baffles terminating at their upper edges at a level above the molten steel bath and preferably at the top of the refractory lining to effectively divide the interior of the tundish into three sub-chambers. The central sub chamber 46 beneath the shroud tube opening is sometimes referred to as the pour box, while the subchambers 48, 50 are located between baffles 42, 44 and end walls 18, 20 respectively, will for. convenience be referred to herein as end chambers. Baffle walls 42, 44 are each provided with a plurality of orifice channels 52 extending therethrough, with the channels 52 being inclined upwardly from the pour box to the respective end chambers to induce currents in the steel bath 36 tending to carry the steel and entrained inclusions upwardly into contact with a liquid flux layer in the end chambers.

The tundish described above is known and has been commercially used. As previously stated, however, the conventional practice has been to use a single flux to provide a substantially uniform coating over the surface of the molten steel throughout the tundish, or in the so-called double layer flux practice, a first flux composition is used to provide a liquid layer over the entire steel surface, and a second layer, generally consisting of a highly siliceous rice hull ash, covering the liquid flux to provide a powder insulating layer. In either case, the same liquid flux layer was in contact with the steel surface throughout the tundish.

In accordance with the present invention, a first basic flux composition having a relatively high melting temperature is deposited onto the surface of the steel 36 in the pour box section to provide a coating 60, and a second basic flux composition having a relatively lower melting temperature is deposited, as through the access openings 28, 30, 32 and 34 to provide a second coating 62 for the steel in the end chambers 48 and 50.

A suitable basic flux for use in the pour box section in the practice of this invention may have the following composition, in percent by weight: CaO 40–50%, $SiO_2$ <15%, MgO 15–25%, $Al_2O_3$ 4–14%, $Na_2O$ 0–3%, C 0–19%, and incidental impurities. Preferably, the $Al_2O_3$ contact will be within the range of about 5% to about 12%. It is recognized, of course that various factors will influence the exact composition of the flux, but for purposes of this invention an important factor is the melting temperature which should be such as to quickly provide a liquid layer in contact with the steel surface but which will not become excessively fluid. For example, reducing the alumina content and increasing the MgO will each increase the melting temperatures, and the exact compositions may be influenced by other considerations including steel chemistry, temperature insulating qualities, and the like.

The steel entering the tundish from the ladle flows downward through the shroud 63 to impinge on an impact pad 64 which reduces tundish refractory erosion. Upward currents carry the steel back into contact with the flux floating thereon where inclusions are absorbed. At the same time steel is flowing outward through channels 52 which produce currents in end chambers 48, 50 carrying the liquid steel upward into contact with the liquid flux layer in these areas. The mean temperature of the molten steel in the end chambers is lower than in the pour box, and in accordance with the present invention, the basic flux composition is adjusted to have a melting temperature to quickly produce a liquid layer in contact with the liquid steel in the cooler end chambers upon start-up of a new tundish. This optimizes the ability of the flux to effectively absorb inclusions and produce clean high quality steel even on the initial heats cast from a tundish.

A suitable basic flux for use in the end chambers may be similar to that described, with the composition adjusted to lower the melting temperature the desired amount. Preferably the adjustments will include increasing the alumina content to within the range of about 10–25% and preferably about 10–20%, and may also include reducing the MgO content to as little as about 10%.

As previously indicated a fast melting flux has poor heat insulating qualities. This may be partially compensated for by increasing the carbon content in the flux where carbon in the steel is not critical, but this option is not available where low or ultra low carbon steel is being cast.

While increasing the alumina content of the flux reduces its melting temperature, increased alumina content decreases the alumina absorbing capacity of the liquid flux. This places a practical upper limit on the optimal alumina content of the parent flux which will enhance liquid slag generation while simultaneously maintaining a satisfactory alumina absorbing capacity.

In a modification of the improved fluxing practice described above, a layer of relatively fast melting flux 62 is deposited on the molten steel in the end chambers to quickly generate a liquid layer, then a layer of a flux 66 of lower alumina, or higher melting temperature flux, is deposited on top of the liquid layer. The layer of a third flux may be the same basic flux employed in the pour box, and preferably will have an $Al_2O_3$ content within the range of about 5% to about 12%. This procedure provides an insulating layer on top and, due to the continuous interaction between the two layers, produces an interchange, or mixing, which will help to maintain an optimal ratio of lime to alumina in the liquid layer for inclusion absorption.

While the invention has been described with reference to a rectangular tundish employed in a two strand casting operation, it is believed apparent that the invention is equally applicable to a single strand tundish, or to a T-shaped or L-shaped tundish. Also, while preferred basic lime-alumina fluxing compositions have been described, variations and departures from these basic fluxes may be employed. Accordingly while preferred embodiments of the invention have been described, it is understood that the invention is not so limited but rather that it is intended to include all embodiments which come within the spirit and scope of the invention and which would be apparent to one skilled in the art.

What is claimed is:

1. In a process of continuously casting steel wherein liquid steel is teemed from a ladle through a shroud tube into a tundish and flows from the tundish through at least one outlet remote from the shroud tube into a casting mold, and a layer of flux is employed to cover the surface of the liquid steel in the tundish, the improvement comprising, covering the liquid steel surface in a first area of the tundish surrounding the shroud tube with a layer of a first flux and covering the liquid steel surface in the remaining area of the tundish with a layer of a second flux, providing baffle means projecting upwardly from the liquid steel surface separating the areas covered by and preventing intermixing of said layers of said first and second fluxes, said first flux having a melting temperature providing a liquid flux layer covering and contacting the steel surface in said first area and said second flux having a melting temperature lower than the melting temperature of said first flux and providing a liquid flux layer covering the steel surface in the remaining area of the tundish.

2. The process defined in claim 1, wherein said first and second fluxes are basic fluxes containing $Al_2O_3$ and about 40% to 50% by weight of CaO, and wherein said second flux contains a greater amount of $Al_2O_3$ then said first flux.

3. The process defined in claim 2, wherein said first flux contains from at least about 4% to about 14% $Al_2O_3$.

4. The process defined in claim 2, wherein said second flux contains about 10% to about 25% $Al_2O_3$.

5. The process defined in claim 2, wherein said first flux contains at least about 5% to about 12% $Al_2O_3$ and said second flux contains from about 10% to about 20% $Al_2O_3$.

6. The process defined in claim 1, further comprising the step of covering said second flux with a third flux having a melting temperature higher than the melting temperature of said second flux.

7. The process defined in claim 6, wherein said second and third fluxes are each basic fluxes containing $Al_2O_3$ and about 40% to about 50% CaO, by weight, and wherein said third flux contains a lower percentage of $Al_2O_3$ than said second flux.

8. The process defined in claim 7, wherein said second flux contains from about 10 to about 20% by weight of $Al_2O_3$ and wherein said first and third fluxes each contain at least about 5% $Al_2O_3$.

9. The process defined in claim 8, wherein said first flux contains from about 5% to about 12% $Al_2O_3$ and said second flux contains from about 12% to about 20% $Al_2O_3$.

10. The process defined in claim 9, wherein said first and third fluxes have substantially the same composition.

* * * * *